US012733590B2

(12) United States Patent
Shenk et al.

(10) Patent No.: US 12,733,590 B2
(45) Date of Patent: Sep. 15, 2026

(54) WINDGUARD ASSEMBLY FOR AGRICULTURAL BALER

(71) Applicant: CNH Industrial America LLC, New Holland, PA (US)

(72) Inventors: Jonathan Shenk, Lititz, PA (US); William D. Hotaling, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 354 days.

(21) Appl. No.: 18/506,717

(22) Filed: Nov. 10, 2023

(65) Prior Publication Data

US 2025/0151655 A1 May 15, 2025

(51) Int. Cl.
*A01D 89/00* (2006.01)
*A01F 15/10* (2006.01)

(52) U.S. Cl.
CPC .......... *A01D 89/008* (2013.01); *A01F 15/106* (2013.01)

(58) Field of Classification Search
CPC ...... A01D 89/008; A01F 15/10; A01F 15/106
See application file for complete search history.

(56) References Cited

U.S. PATENT DOCUMENTS 1,065,963 A 7/1913 Norquest
2,430,734 A * 11/1947 Raney .................... A01D 89/00 56/364
7,617,662 B2 * 11/2009 Erdmann ............. A01D 89/008 56/364
9,510,512 B2 * 12/2016 Dumarey ............. A01D 89/002
9,681,603 B2 * 6/2017 McClure .............. A01D 89/008
10,111,387 B1 * 10/2018 Derscheid ............ A01D 89/008
11,547,053 B2 1/2023 Lammerant et al.
2014/0250855 A1 9/2014 Vandamme et al.
2021/0274716 A1 9/2021 Lammerant et al.
2021/0360859 A1 11/2021 Childs
2026/0076309 A1 * 3/2026 Shenk .................. A01D 89/008

FOREIGN PATENT DOCUMENTS

EP 1252813 A1 * 10/2002 ........... A01D 89/008

* cited by examiner

*Primary Examiner* — Alicia Torres

(74) *Attorney, Agent, or Firm* — Buchanan Ingersoll & Rooney PC

(57) ABSTRACT

A windguard assembly for a baler that is configured to either limit or prevent crop material from being blown away by the wind during feeding of the crop material into a bale chamber of the baler. The windguard assembly includes a roller that is configured to rotate about an axis of rotation. The roller includes a plurality of crop engaging surfaces that are configured to transport the crop material toward the bale chamber. The windguard assembly also includes a tine assembly that is pivotably mounted with respect to the roller about the axis of rotation. The tine assembly includes a transversely-mounted shaft and a plurality of axially spaced-apart tines extending from the shaft.

15 Claims, 3 Drawing Sheets

30
31
204
203
210A
200
333
201
223
214
12b

WINDGUARD ASSEMBLY FOR AGRICULTURAL BALER

FIELD OF THE INVENTION

The present invention relates to agricultural balers, and, more particularly, to windguard systems used with such balers.

BACKGROUND OF THE INVENTION

Agricultural packaging machines, such as balers, for example, are used to consolidate and package crop material so as to facilitate the storage and handling of the crop material for later use. In the case of hay, a mower-conditioner cuts and conditions the crop material for windrow drying in the sun. In the case of straw, an agricultural combine discharges non-grain crop material from the rear of the combine which is to be picked up by the baler. The crop material is typically raked and dried, and a baler, such as a round baler or a square baler, for example, straddles the windrows and travels along the windrows to pick up the crop material and form it into round or square bales. More specifically, a pickup unit at the front of the baler gathers the cut and windrowed crop material from the ground and then conveys the cut crop material into a bale-forming chamber within the baler. After the bale is formed and wrapped by a wrapping mechanism, the rear portion of the baler is configured to open and discharge the bale onto the field.

The pickup unit of some balers includes a pickup reel and a windguard with tines. The tines hold down the hay or other crop material as it is being fed to prevent the crop material from being blown off the reel and to ensure an adequate compaction of the crop material. Many known windguard designs suffer from dead spaces where the crop is not held closely by the windguard against the pickup tines of the reel throughout the entire crop path. Described herein is an improved windguard design that seeks to eliminate the dead spaces.

SUMMARY OF THE INVENTION

According to one aspect, a windguard assembly for a baler is configured to either limit or prevent crop material from being blown away by the wind during feeding of the crop material into a bale chamber of the baler. The windguard assembly includes a roller that is configured to rotate about an axis of rotation. The roller includes a plurality of crop engaging surfaces that are configured to transport the crop material toward the bale chamber. The windguard assembly also includes a tine assembly that is pivotably mounted with respect to the roller about the axis of rotation. The tine assembly includes a transversely-mounted shaft and a plurality of axially spaced-apart tines extending from the shaft.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "forward," "rearward," "upward," "downward," "left," and "right," when used in connection with the agricultural baler described herein and/or components thereof are usually determined with reference to the direction of forward operative travel of the towing vehicle and the height of the baler, but they should not be construed as limiting. The terms "longitudinal" and "transverse" are determined with reference to the fore-and-aft direction of the towing vehicle and the width of the baler, and are equally not to be construed as limiting.

Figure 1:
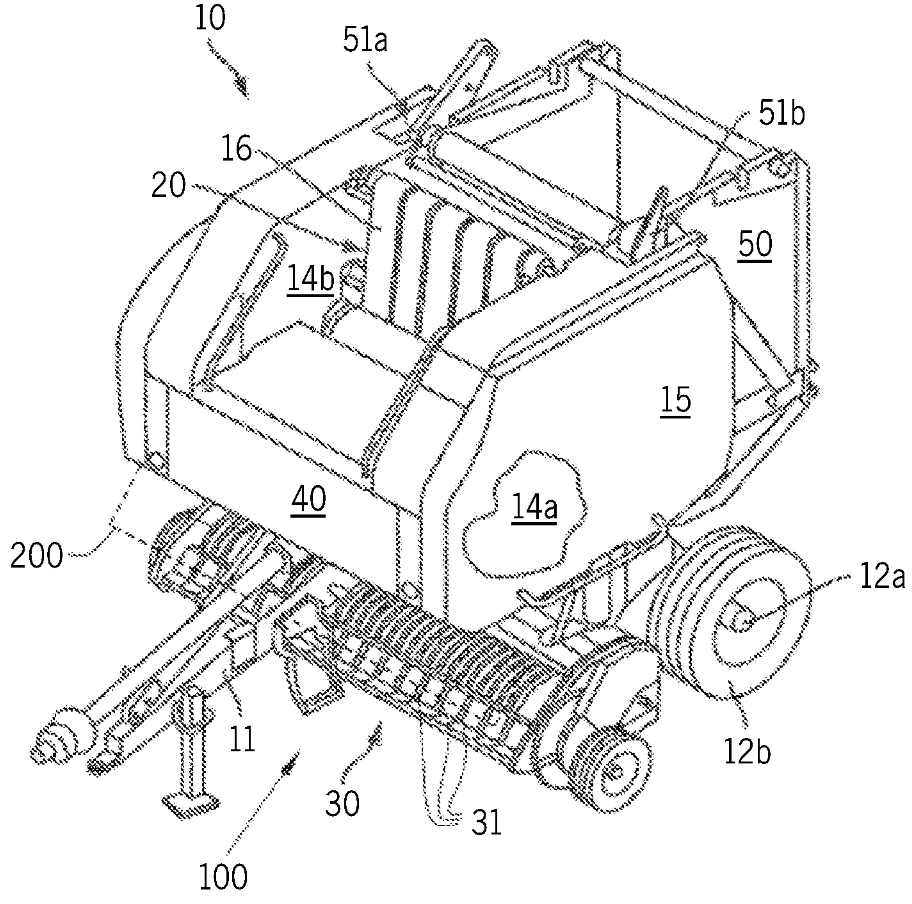
FIG. 1 illustrates an embodiment of an agricultural baler that includes a windguard assembly shown in phantom lines.

Referring now to the drawings, and more particularly to FIG. 1, illustrated is a round baler 10, which can be connected to and pulled behind an agricultural vehicle, such as a tractor (not shown), for example. The baler 10 includes a chassis terminating forwardly in a tongue 11 and rearward slightly beyond a transverse axle 12*a* to which a pair of wheels 12*b* (only one shown) is mounted, thus forming a wheel supported chassis. The chassis supports a series of belts 16 and floor rolls, which together with a first sidewall 14*a* (shown in the breakout) behind and generally parallel to cover panel 15 and a second sidewall 14*b*, collectively form a bale chamber 20. Cut crop material is lifted from windrows into the baler 10 using a pickup assembly 100. The pickup assembly 100 generally includes a transversely oriented rotatable pickup roll 30 and a plurality of tines 31 carried by the pickup roll 30.

From the pickup assembly 100, the crop material is transported to and fed through a feeding assembly into the bale chamber 20. As the crop material enters the bale chamber 20, multiple carrier elements, e.g. rollers, chains and slats, and/or belts (e.g., a series of conveyor belts 16), for example, begin to roll a bale of hay within the chamber, forming a cylindrically shaped bale. These carrier elements are movable so that the chamber can initially contract and subsequently expand to maintain an appropriate amount of pressure on the periphery of the bale. The bale is then optionally wrapped with twine or a net wrapping material dispensed from a wrapping mechanism generally arranged behind shield 40. Upon completion of the optional wrapping process, tailgate 50 pivots upwardly about pivot points 51*a*, 51*b* and the bale is discharged onto the ground.

Further details of baler 10 may be described in U.S. Pat. No. 11,547,053, which is incorporated by reference herein in its entirety and for all purposes.

Figure 2:
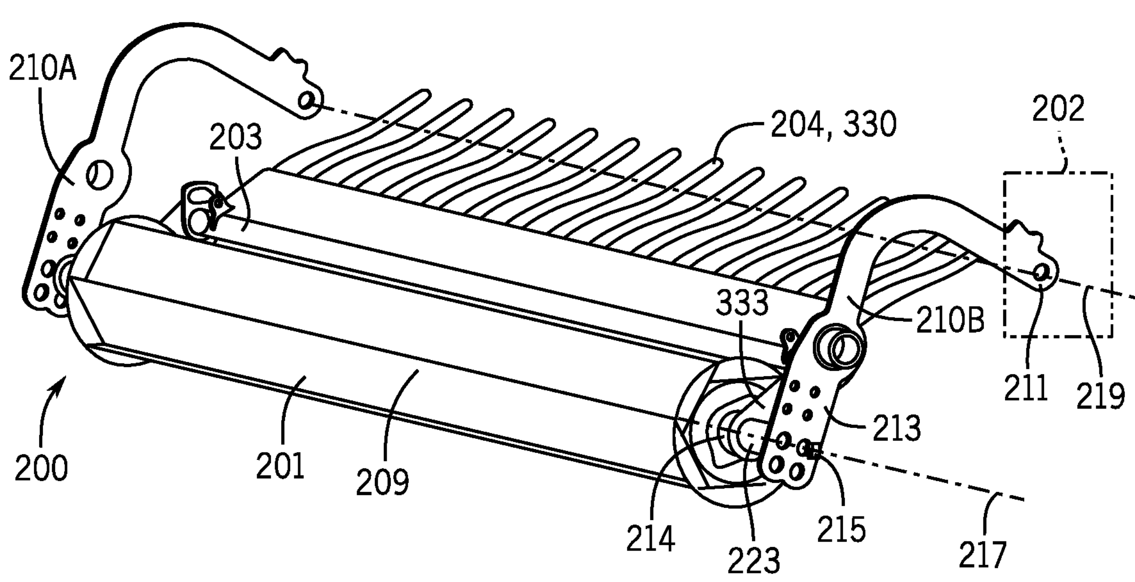
FIG. 2 illustrates a perspective view of the windguard assembly of FIG. 1.
Figure 3:
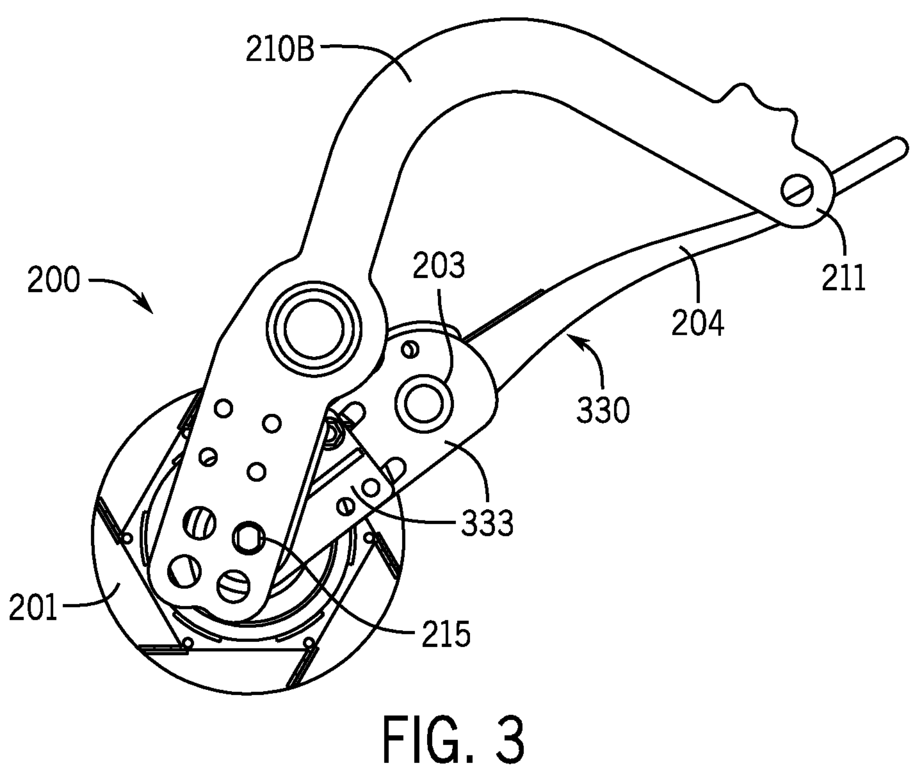
FIG. 3 illustrates a side elevation view of the windguard assembly of FIG. 2.
Figure 4:
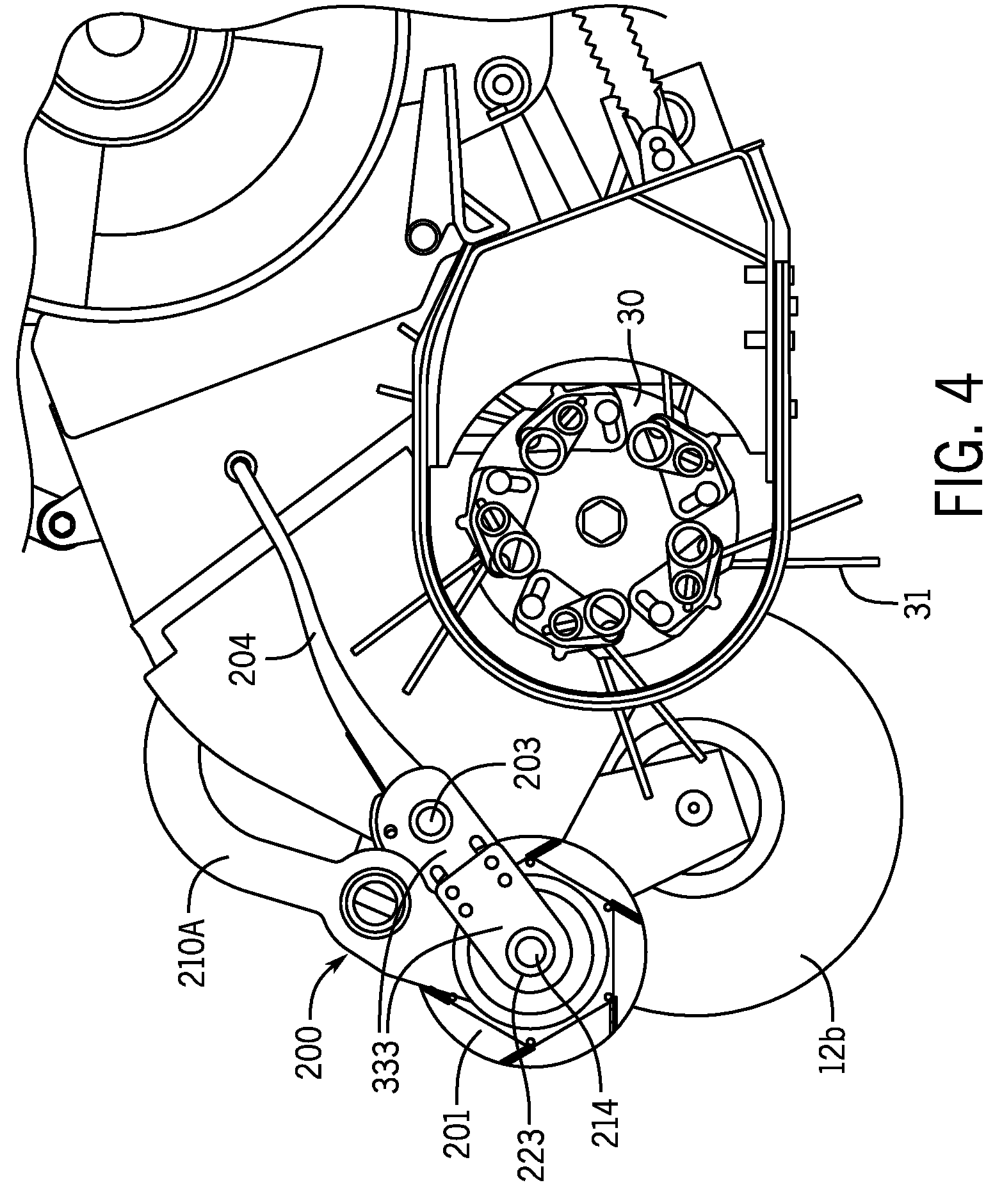
FIG. 4 is a side elevation view of a segment of the baler of FIG. 1 including the windguard assembly.

Referring now to FIGS. 2-4, the baler 10 includes a windguard assembly 200 that includes a transversely mounted windguard roll (or roller) 201 that is rotatably coupled to a frame structure 202 of baler 10 (shown schematically) by a pair of arms 210A, 210B. The cylindrical body of roll 201 has a series of transversely mounted bars 209 (i.e., crop engaging surfaces) arranged about its perimeter for compacting the crop material against the pickup roll 30. Roll 201 rotates as the crop moves over its surfaces and is not actively powered by a belt or actuator, however, roll 201 may be actively powered, if so desired.

Each arm 210A, 210B has a curved shape that includes a first end 211 including an opening that is pivotably coupled to the frame 202 by a pin or fastener (for example) and a second end 213, which is opposite the first end 211, to which the windguard roll 201 is mounted. Roll 201 includes a central shaft 214, and ends of shaft 214 are mounted to respective bearings or bushings 223. Each second end 213 includes a plurality of openings (four shown) one of which is mounted to one of the bushing 223 by a pin, bearing or fastener 215. It should be understood that roll 201 rotates about an axis 217 defined through shaft 214. Axis 217 also passes through bushing 223 and fastener 215. Axis 217 may also be described as the longitudinal axis or axis of rotation of roll 201. It should be understood that roll 201 is rotatable about its own axis 217, whereas roll 201 is pivotable with respect to frame 202 about a different axis 219 defined by arms 210A, 210B.

Windguard assembly 200 also includes a tine assembly 330 that is pivotably mounted relative to roll 201. Tine assembly 330 includes a rod, tube or shaft 203, elongated fingers or tines 204 extending rearwardly from shaft 203, and arms 333 fixed to opposing sides of shaft 203. The components of tine assembly 330 may form a weldment that are fixedly mounted together. Shaft 203 and its tines 204 are mounted to bushing 223 (or shaft 214 of roll 201) by arms 333. Arms 333 are pivotably mounted about axis 217 by bushing 223.

Arms 333 may pivot either freely or by a limited amount about axis 217 to adjust to the volume of crop flowing beneath tines 204. Although not shown, a rotation limiter (e.g., a bracket, flange or pin in slot) may be connected between arms 333 and arms 210 (or frame 202) to limit pivoting action of tine assembly 330 relative to frame 202 (and about axis 217) between two end points. It should be understood that roll 201 can rotate about axis 217 while arms 333 remain stationary, and arms 333 can pivot about axis 217 while roll 201 remains stationary.

As compared with many known windguards, the windguard tines 204 of windguard assembly 200 are better configured to hold the crop against the pick-up tines 31, thereby improving feeding performance of pick-up assembly 100 by eliminating any dead spots between tine assembly 330 and pickup assembly 100. Specifically, by arranging the pivot axis of tines 204 on the axis of rotation of roller 201, tines 204 are positioned closer to the flow of crop as well as closer to the pick-up roll 30 of pick-up assembly 100.

Shaft 203 and its tines 204 may be non-rotatable (i.e., fixed) with respect to arms 333, as described above. Alternatively, shaft 203 and its tines 204 may be pivotably mounted to arms 333. Such an additional point of rotation would allow the tines 204 to more closely follow the path of crop flow and be in even closer proximity to the pick up roll 30. Shaft 203 may be either freely pivotable with respect to arms 333 or pivotable to a limited degree relative to shaft 203. For example, a rotation limiter (e.g., a bracket, flange or pin in slot) may be connected between shaft 203 and arms 333 to limit pivoting action of shaft 203 and tines 204 relative to arms 333 between two end points.

The windguard assembly illustrated in the figures and described above can be implemented in any hay and forage agricultural vehicle that harvests a grass type crop, including but not limited to pull-type forage harvester grass pickups, self-propelled forage harvester grass pickups, round baler pickups, small square baler pickups, or large square baler pickups, for example.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A windguard assembly for an agricultural baler that is configured to either limit or prevent crop material from being blown away by the wind during feeding of the crop material into a bale chamber of the agricultural baler, the windguard assembly including:

a transversely mounted roller that is configured to rotate about a first axis of rotation, wherein the roller includes a plurality of crop engaging surfaces that are configured to transport the crop material toward the bale chamber; and a tine assembly that is pivotably mounted with respect to the roller about the first axis of rotation, the tine assembly comprising a transversely mounted shaft and a plurality of axially spaced-apart tines extending longitudinally from the shaft, wherein the tine assembly is configured to pivot about the first axis of rotation while the roller remains stationary.

2. The windguard assembly of claim 1, wherein the roller is configured to rotate about the first axis of rotation while the tine assembly remains stationary.

3. The windguard assembly of claim 1, wherein the crop engaging surfaces are bars mounted to a cylindrical body of the roller.

4. The windguard assembly of claim 1, wherein the tine assembly further comprises tine arms that are mounted to a bushing that is connected to a shaft of the roller, and wherein the tine arms are further configured to be connected to a frame of the agricultural baler.

5. The windguard assembly of claim 4, wherein the shaft of the tine assembly is fixedly and non-rotatably mounted to the tine arms.

6. The windguard assembly of claim 4, wherein the shaft of the tine assembly is pivotably mounted to the tine arms to define a second axis of rotation.

7. The windguard assembly of claim 4, further comprising assembly arms configured to be coupled to the frame of the agricultural baler, wherein:

each arm of the assembly arms has a first end that is pivotably mounted to the frame of the agricultural baler and a second end, opposite the first end, that is mounted to the roller, and the windguard assembly is pivotable with respect to the frame about a third axis of rotation that passes through the first ends of the assembly arms.

8. The windguard assembly of claim 7, wherein the second end of the assembly arms is also mounted to the bushing such that the roller can rotate with respect to the assembly arms.

9. The windguard assembly of claim 7, wherein the second end includes a plurality of openings each of which can be selectively mounted to the roller.

10. The windguard assembly of claim 7, wherein the windguard assembly is pivotable about the third axis of rotation that passes through the first ends of the assembly arms.

11. The windguard assembly of claim 6, wherein the tine arms are configured to pivot about the second axis of rotation relative to the roller.

12. The windguard assembly of claim 7, wherein each arm of the assembly arms has a curved body.

13. The windguard assembly of claim 1, wherein the first axis of rotation constitutes a pivot axis of the tine assembly.

14. An agricultural baler comprising the windguard assembly of claim 1, wherein the transversely mounted roller is configured to compress crop against a rotatable pick-up roller of the agricultural baler.

15. An agricultural vehicle comprising the agricultural baler of claim 1, wherein the agricultural baler comprises a tongue that is mounted to a hitch on the agricultural vehicle.

* * * * *